(12) United States Patent
Boatright et al.

(10) Patent No.: US 12,223,598 B2
(45) Date of Patent: Feb. 11, 2025

(54) METHODS AND SYSTEMS FOR GENERATING A MAP MESH FOR AUTONOMOUS DRIVING

(71) Applicant: Argo AI, LLC, Pittsburgh, PA (US)

(72) Inventors: Cory Boatright, Grove City, PA (US); Casey Joseph Carlin, Santa Clara, CA (US)

(73) Assignee: VOLKSWAGEN GROUP OF AMERICA INVESTMENTS, LLC, Reston, VA (US)

(*) Notice: Subject to any disclaimer, the term of this patent is extended or adjusted under 35 U.S.C. 154(b) by 175 days.

(21) Appl. No.: 18/146,548

(22) Filed: Dec. 27, 2022

(65) Prior Publication Data
US 2024/0212277 A1  Jun. 27, 2024

(51) Int. Cl.
| | |
|---|---|
| *G06T 17/20* | (2006.01) |
| *B60W 30/18* | (2012.01) |
| *G05D 1/00* | (2024.01) |
| *G06F 16/29* | (2019.01) |
| *G06T 7/13* | (2017.01) |
| *G06T 17/05* | (2011.01) |

(Continued)

(52) U.S. Cl.
CPC ........... *G06T 17/20* (2013.01); *G05D 1/0088* (2013.01); *G06F 16/29* (2019.01); *G06T 7/13* (2017.01); *G06T 17/05* (2013.01); *G06V 10/25* (2022.01)

(58) Field of Classification Search
CPC ........ B60W 30/18154; B60W 60/001; B60W 2420/403; B60W 2552/10; B60W 2552/53; B60W 2556/40; B60W 2556/50; G01C 21/3461; G01C 21/367; G01C 21/3815; G06F 18/23; G06F 16/29; G06K 9/00798; G06K 9/6218; G06V 20/56; G06V 20/588; G06V 10/25; G06T 17/20; G06T 17/13; G06T 17/05; G05D 1/0088
See application file for complete search history.

(56) References Cited

U.S. PATENT DOCUMENTS

| | | | |
|---|---|---|---|
| 7,982,735 B2 | 7/2011 | Lee et al. | |
| 9,214,099 B2 | 12/2015 | Usui et al. | |

(Continued)

FOREIGN PATENT DOCUMENTS

EP  3647733 A1  5/2020

OTHER PUBLICATIONS

Ray et al., "Array-Based Hierarchical Mesh Generation in Parallel," Procedia Engineering, 124 (2015): 291-303.

*Primary Examiner* — Wesner Sajous
(74) *Attorney, Agent, or Firm* — Fox Rothschild LLP

(57) ABSTRACT

Methods and systems for controlling navigation of an autonomous vehicle for traversing a geographical area are disclosed. The methods include receiving information relating to a drivable area in the geographical area and identifying a plurality of lane segments that intersect with the drivable area. The plurality of lane segments can be used to segment the drivable area into a plurality of sub-regions such that each of the plurality of lane segments can be represented as a union of a unique subset of the plurality of sub-regions. A data representation of the drivable area may be created to include the plurality of sub-regions, and used to render the map of the geographical area. The map includes the drivable area and/or one or more of the plurality of lane segments.

16 Claims, 10 Drawing Sheets

(51) Int. Cl.
    *G06V 10/25*          (2022.01)
    *G06V 20/56*          (2022.01)

(56) References Cited

U.S. PATENT DOCUMENTS

| | | |
|---|---|---|
| 11,170,230 B2 | 11/2021 | Jiang et al. |
| 11,679,780 B2 * | 6/2023 | McAlister ............... G06V 10/25 |
| | | 701/1 |
| 11,851,083 B2 * | 12/2023 | Hartnett ................. G06V 20/56 |
| 11,904,906 B2 * | 2/2024 | Metz ................. B60W 60/0017 |
| 11,964,669 B2 * | 4/2024 | Seegmiller ......... G01C 21/3453 |
| 2007/0266055 A1 | 11/2007 | Nomura |
| 2020/0293564 A1 | 9/2020 | Reh et al. |
| 2022/0219720 A1 * | 7/2022 | Hartnett .......... B60W 30/18154 |
| 2024/0192021 A1 * | 6/2024 | Batsos ............... G01C 21/3841 |

* cited by examiner

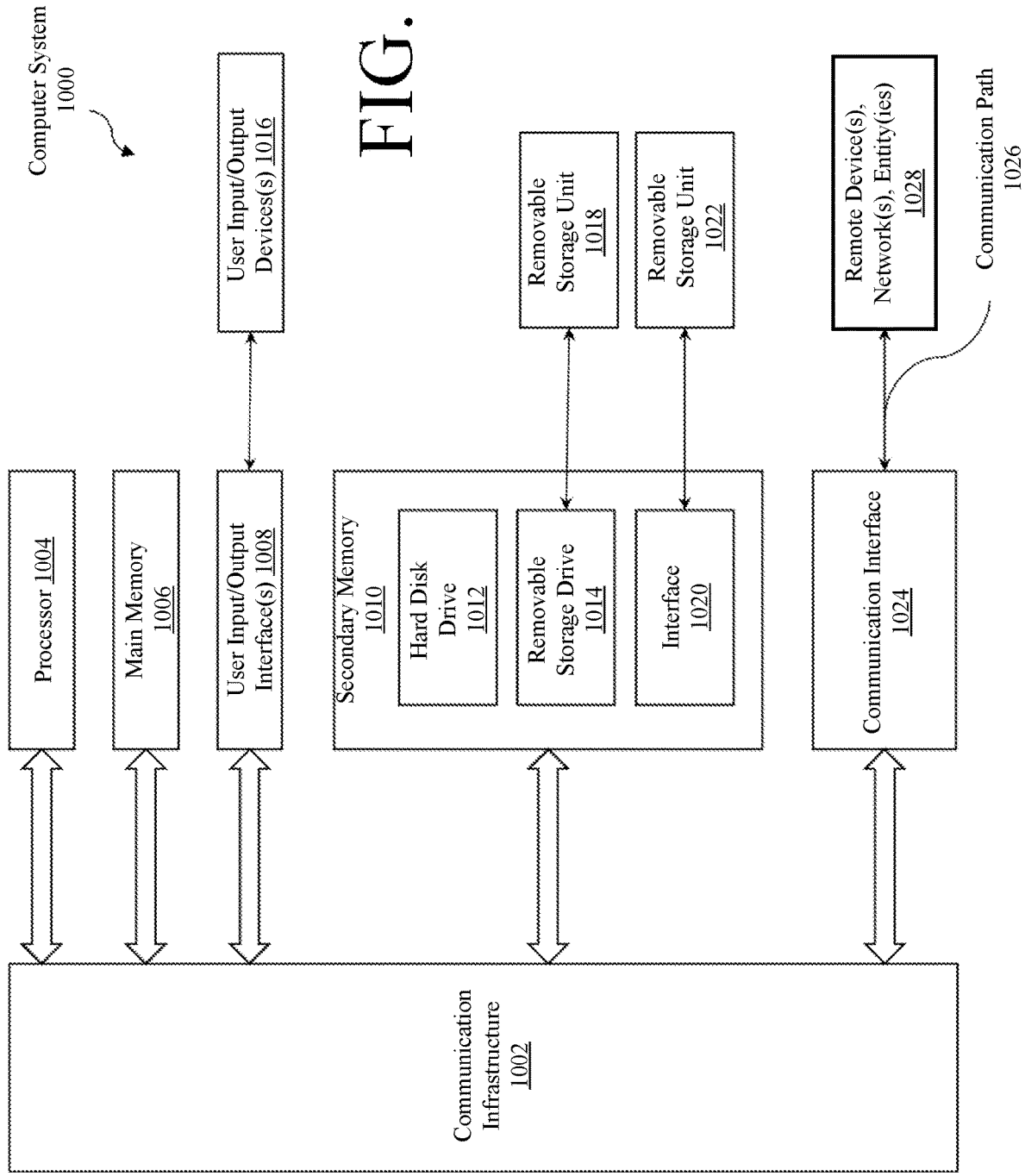

METHODS AND SYSTEMS FOR GENERATING A MAP MESH FOR AUTONOMOUS DRIVING

BACKGROUND

Autonomous driving systems require certainty in the position of and distance to geographic features surrounding the vehicle with a sufficient degree of accuracy to adequately control the vehicle. Details about the road or other geographic features surrounding the vehicle can be recorded on a map. The more accurate the detailed map, the better the performance of the autonomous driving system.

In order to predict the trajectory of actors, the autonomous vehicle may also identify a drivable area from the detailed map information. Drivable area for autonomous vehicles is a simplified representation of a real driving environment that includes areas in which vehicles are reasonably expected to be able to drive (e.g., streets, lanes, parking areas, etc.). Identification of drivable areas helps facilitate driving decision processes such as by delineating areas such as sidewalks, buildings, etc. However, drivable areas are typically large segments and cannot be used to infer meaningful information about smaller discrete sections of the map such as lane segments. As such, lane segments need to be separately rendered on a drivable area leading to computational inefficiencies, and redundant memory usage.

This document describes methods and systems that are directed to addressing the problems described above, and/or other issues.

SUMMARY

In various scenarios, systems and methods for controlling navigation of an autonomous vehicle for traversing a geographical area are disclosed. The methods may include receiving information relating to a drivable area in the geographical area and identifying a plurality of lane segments that intersect with the drivable area. The plurality of lane segments may be used to segment the drivable area into a plurality of sub-regions such that each of the plurality of lane segments can be represented as a union of a unique subset of the plurality of sub-regions. A data representation of the drivable area may be created to include the plurality of sub-regions, and used to render the map of the geographical area. The map may can include the drivable area and/or one or more of the plurality of lane segments.

Implementing systems of the above-described methods can include, but are not limited to, a processor and a non-transitory computer-readable storage medium comprising programming instructions that are configured to cause the processor to implement a method for generating maps. Optionally, the programming instructions may be included in a computer program product.

BRIEF DESCRIPTION OF THE DRAWINGS

FIG. 10 provides an illustration of a computer system.

DETAILED DESCRIPTION

Figure 1:
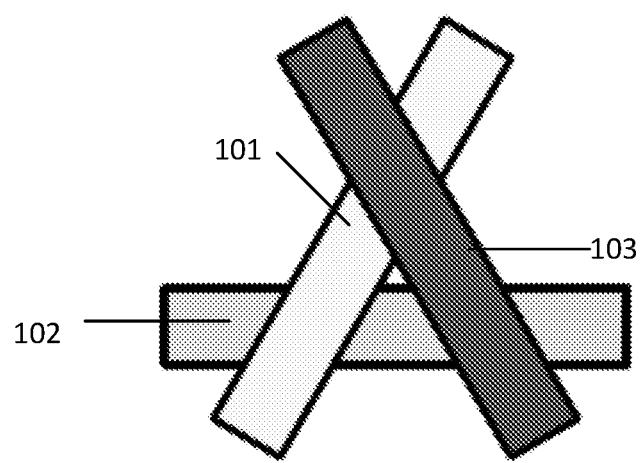
FIG. 1 illustrates a schematic representation of rendering of example lane segments that overlap with each other, using prior art methods.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

In one present embodiment, the speed and/or functionality of a navigation system can be enhanced by a combination that includes improvements in the storage, arrangement, and/or structuring of the geographic data (e.g., comprising map data) used by the system to facilitate the use of the data by some of the functions during, for example, navigation of a vehicle. Based upon the manner in which the geographic data are stored, arranged, and/or structured, functions (e.g., during navigation) that access and use the data can implement routines that exploit the improvements incorporated into the geographic data. This combination can result in overall improved performance by a navigation system.

One way that the accessing of geographic data can be enhanced for performing various navigation functions is to provide separate collections or subsets of the geographic data for modular use and access during various navigation functions. Another way that the geographic data can be organized to enhance their use is to provide the data in layers. For example, when performing route calculation, it may be advantageous to use the geographic data at different levels of detail. For example, when calculating a route between two locations, it would be inefficient to examine all the possible road segments that diverge from each intersection along the route, including secondary streets and alleys. Instead, once a route is "on" a main road or expressway, it is generally preferable to stay on main roads or expressways until it is necessary to exit to secondary roads as the destination is approached. If the routing data are layered, higher layers that omit secondary roads can be used when possible to minimize the possible road segments to be investigated when calculating the route. Therefore, within some of the subsets of data types, the geographic data are provided in separate collections or groups corresponding to separate map layers.

For example, maps and related data can comprise multiple layers, such as an areas layer, a lane segment layer, an intersections layer, a traffic controls layer, and so forth. The areas layer can include geo spatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lane segments layer can include geospatial information of road lanes (e.g., lane centerline, lane boundaries, type of lane boundaries, etc.) and related attributes (e.g., direction of travel, speed limit, lane type, etc.). The lane segments layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

However, while the organization of some of the data into layers and corresponding groups results in certain efficiencies, it also results in duplication of the data resulting in not only efficiency offsets but also higher memory requirements. As such, having an optimal number of layers that can combine certain data is desirable.

In addition, when, for example, drivable areas are assigned to a separate layer from lane segments, the lane segments need to be rendered separately over drivable area polygons. Such rendering in separate layers may lead to map visualization issues such as overlapping and/or redundant drawing of lane segments, height discrepancies between a drivable area and corresponding lane segments, and/or height offset-overlays. Moreover, lane segment rendering may need to follow certain rules for efficient navigation that define a prioritization order of lane segments during navigation and/or other applications. However, when lane segments are rendered using existing layering solutions, it may be impossible to take into account all the prioritization rules in certain situations. For example, referring to the lane geometries of FIG. 1, if the rules provide that rendering of lane 1 (101) should be given priority over lane 2 (102), rendering of lane 3 (103) should be given priority over lane 1 (101), and rendering of lane 2 (102) should be given priority over lane 3 (103), a feasible rendering solution that allows for consideration of all these rules does not exist. For example, in FIG. 1, rendering of lane 2 (102) is not priority over lane 3 (103).

This document describes systems and methods for overcoming at least some of the issues discussed above by segmenting a drivable area into a mesh including a plurality of polygons (or geometric blocks) using lane segment boundaries, such that a union of all the polygons creates an xy-projection of the drivable area, and an xy-projection of each lane segment of that drivable area is a union of a unique subset of the plurality of polygons. The geographical data, therefore, includes only one layer and corresponding data group that can be used to render and/or provide information about drivable areas as well as lane segments. In other words, each drivable area represented as a plurality of polygons may form a data record of a single geographical layer (and/or data group), where the polygons can be logically and/or physically grouped into subsets to also provide information about and/or render lane segments of a drivable area separately from the drivable area and/or with the drivable area.

A "drivable area" is defined as a geographical area where it is physically possible for an autonomous vehicle to drive, without consideration for legal restrictions. The drivable area of the current disclosure may, optionally, be represented as a collection of one or more connected polygons (e.g., a 2-dimensional mesh) created in accordance with this disclosure. Information about drivable areas in an environment may be included in, for example, a vector map of the environment in the form of vector data (e.g., points, lines, polygons, etc.). A road in a road network typically includes one or more adjacent lanes, which may be divided by lane markings and are intended for a single line of traffic. Lanes may be split longitudinally at lane segments, sometimes at locations meaningful for motion planning (such as the start/end of an intersection) and/or at other locations that may not be meaningful for motion planning as an artifact of the map generation process.

Figure 2:
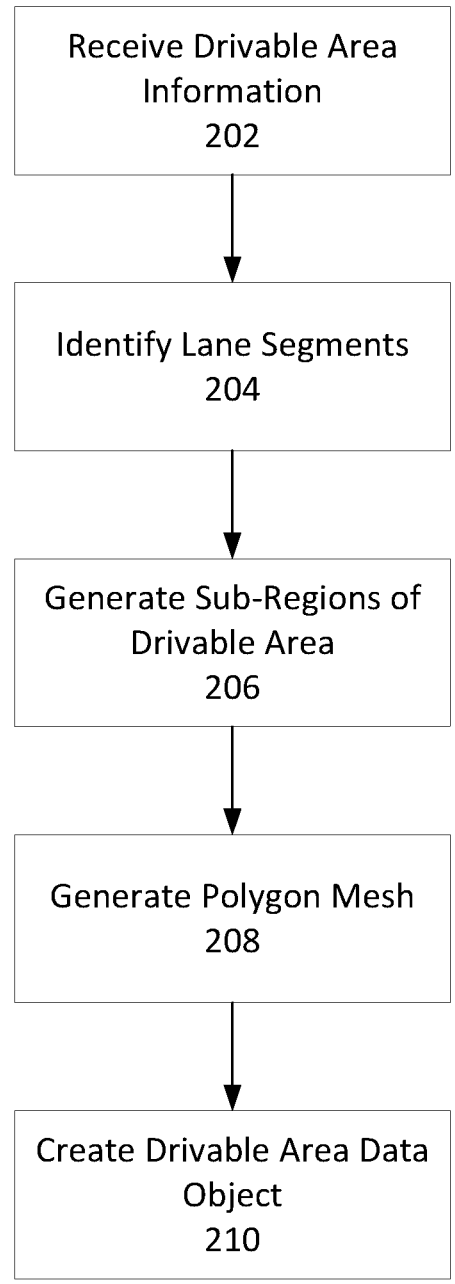
FIG. 2 illustrates a flowchart of an example method for creating a map data structure.

FIG. 2 illustrates a flow chart of an example method of segmenting a drivable area into a plurality of polygons. As shown in FIG. 2, a system may receive 202 drivable area information (e.g., a map of a drivable area) within a geographical region. The system may receive drivable area information from a data store such as, for example, a map data store. In certain embodiments, the drivable area data store may be provided as and/or represent a first layer in a digital map. In some embodiments, the drivable area may be represented as a closed geometrical region having a plurality of edges (curved or straight) that define a perimeter or a boundary of the drivable area. Drivable area information may include data defining the location (e.g., an ordered string of location coordinates that define a perimeter of the drivable area) and properties of the drivable area (e.g., a geometry of the drivable area, number of roads, number of lane segments, associated speed limits, directions of travel, elevation data, etc.). An example of a drivable area corresponding to an intersection is shown as geometrical region 300 in FIG. 3A.

Figure 3A:
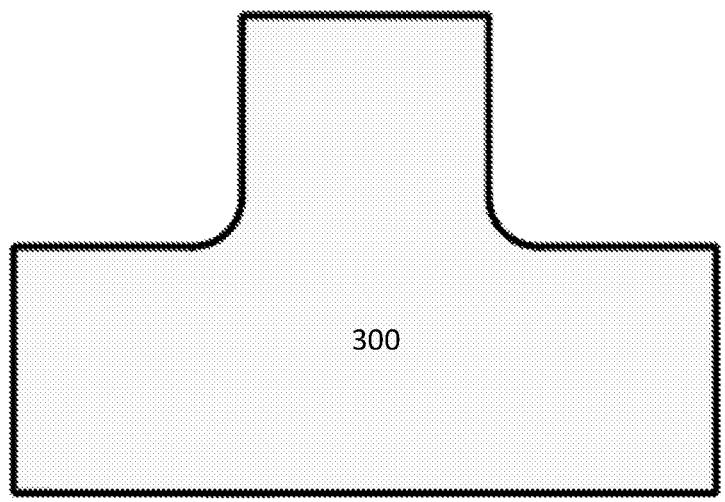
FIG. 3A illustrates an example drivable area corresponding to an intersection.
Figure 3B:
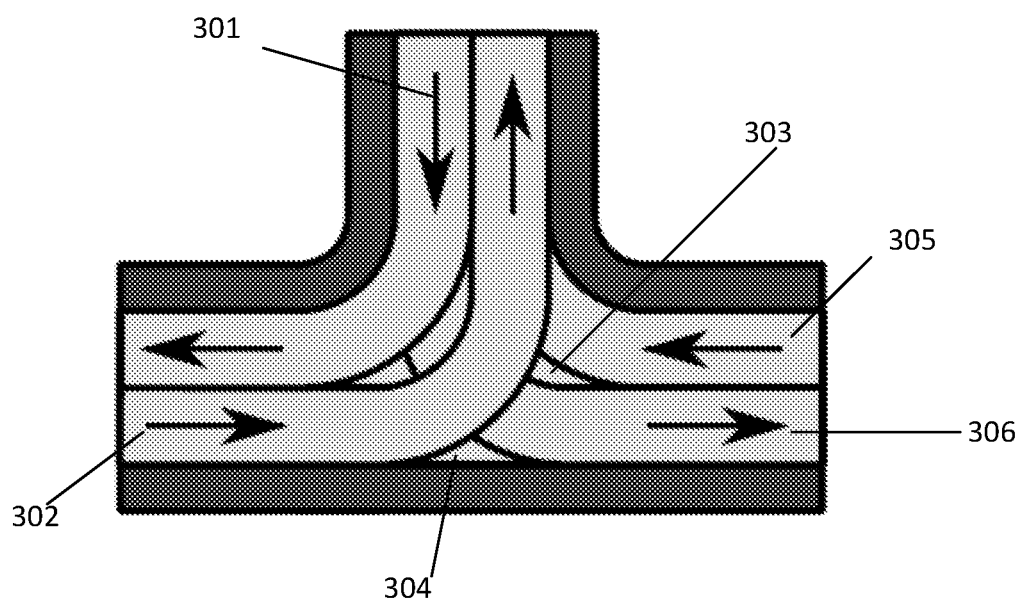
FIG. 3B illustrates example lane segments associated with the drivable area of FIG. 3A.

Referring back to FIG. 2, the system may identify 204 one or more lane segments that lie within the drivable area. Example lane segments 301, 302, 303, 304, 305, and 306 corresponding to the drivable area 300 of FIG. 3A are shown in FIG. 3B.

The system may receive lane segment identification from a data store such as, for example, a map data store. In certain embodiments, the lane segment data store may be provided as and/or represent a second layer in a digital map.

Lane segment information in a data store (e.g., map data store) may include or be associated with geometry information (e.g., corresponding longitudinal and lateral boundary elements, a height elements, centerline path information, elevation of lane segment points, etc.), location information (e.g., location coordinates), lane segment identifiers, lane segment attributes (e.g., direction of travel, speed limits, rendering rules, lane segment type, restrictions, etc.). The data store may also include identification(s) of drivable areas that the lane segments intersect, and can, therefore, be searched to identify the lane segments that intersect with or lie at least partially within the drivable area (by, for example, matching the drivable area identifications). Additionally and/or alternatively, the system may identify the lane segments by analyzing location information of the drivable area and location information of the lane segments to identify lane segments that have portions that intersect with the drivable area.

Lateral boundary elements describe the physical location of the lateral boundaries of a lane in a direction that is generally along or parallel to the flow of traffic of the lane. For example, a lateral boundary of a lane does not cross the flow of traffic of the lane. Longitudinal boundary elements describe the physical location of the longitudinal boundaries of a lane in a direction that is generally across the flow of traffic of the lane. For example, a longitudinal boundary of a lane does cross the flow of traffic of the lane. For example, a longitudinal boundary element may be located at and/or indicate the location of the stop line painted on the road surface. Height elements of a lane segment describe the elevation of various points the lane segment (e.g., with respect to a ground surface).

In various embodiments, the system may store information pertaining to one or more identified lane segments of the drivable area in one or more data stores. This information may include, for example, an identifier associated with a lane segment, information for generating a polygon that represents the portion of each lane segment that intersects with the drivable area (e.g., lateral elements and/or longitudinal elements), height elements, and/or the like.

Figure 4:
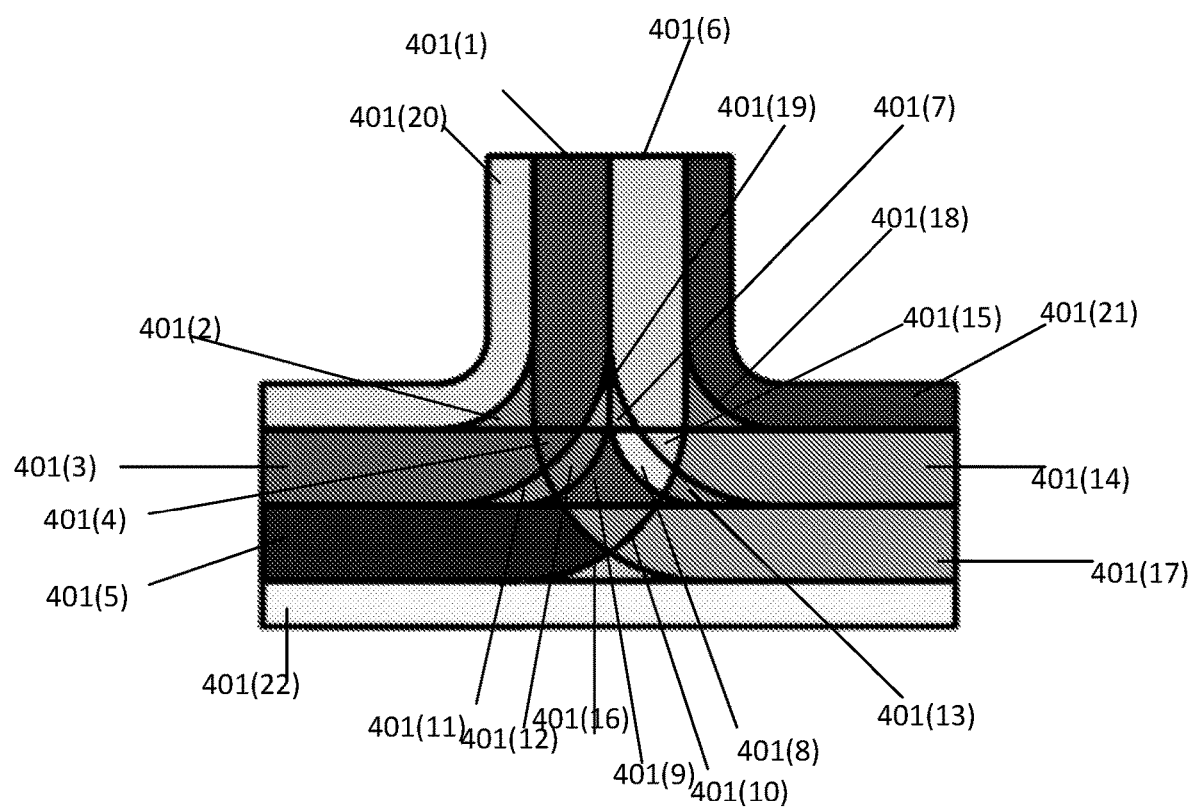
FIG. 4 illustrates a schematic representation of rendering of lane segments of FIG. 3B on the drivable area of in accordance with the current disclosure.

Next, the system may divide the geometrical region corresponding to the drivable area into a plurality of smaller regions using the lane segment information (206) to generate a drivable area mesh. Each lane segment portion that intersects with the drivable area may be represented as a union of a subset of the plurality of regions that form the drivable area map. For example, FIG. 4 illustrates the plurality of polygons 401(1)-(n) that together form the drivable area 300 of FIG. 3A and created using the lane segments of FIG. 3B. As shown in FIG. 4, lane segment 301 of FIG. 3B may be represented by the subset including regions 401(1)-(4), lane segment 302 of FIG. 3B may be represented by the subset including regions 401(5)-(10), lane segment 303 of FIG. 3B may be represented by the subset including regions 401(3), 401(4), 401(11), 401(12), 401(9) 401(8), 401(13), 401(140), and 401(15), lane segment 304 of FIG. 3B may be represented by the subset including regions 401(5), 401(16), 401(10), and 401(17), lane segment 305 of FIG. 3B may be represented by the subset including regions 401(14), 401 (15), 401(18), and 401(6), and lane segment 306 of FIG. 3B may be represented by the subset including regions 401(17), 401(8), 401(9), 401(10), 401(7), 401(19), and 401(6). Further, as shown in FIG. 4, certain regions such as 401(21), 401(22) . . . 401(n), etc. may not correspond to any of the lane segments.

Figure 5A:
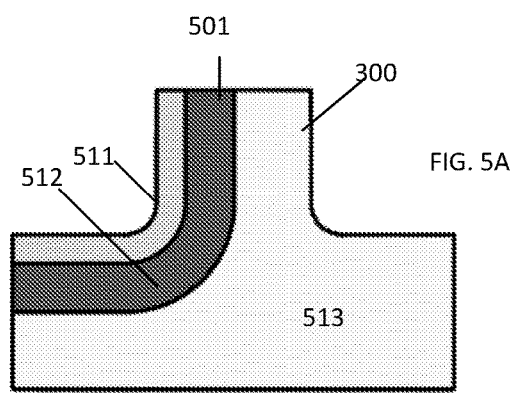
FIGS. 5A-5F illustrate example representations for creation of polygons within the drivable area of FIG. 3A using the lane segments of FIG. 3B.

FIGS. 5A-5F illustrates example representations for dividing the drivable area geometrical region 300 into a plurality of regions using the lane segments of FIG. 3B. Specifically, regions representative of lane segment portions (from FIG. 3B) that intersect or overlap with the drivable area (300 from FIG. 3A) may be identified to generate the plurality of regions. For example, as shown in FIG. 5A, a first region 501 corresponding to an overlap between the lane segment 301 is identified within the drivable area region 300. The first region 501 divides the region 300 into three sub-regions 512, 511 (overlapping with 501) and 513. The first region may be identified using any now or hereafter known methods for identifying overlaps between map regions such as, without limitation, using location coordinates that define the perimeters of the respective regions, subtracting a lane segment area from a drivable area region (or vice versa), projecting the regions on an xy-surface (or canvas) mesh and analyzing intersections between mesh polygons (described below), or the like.

Figure 5B:
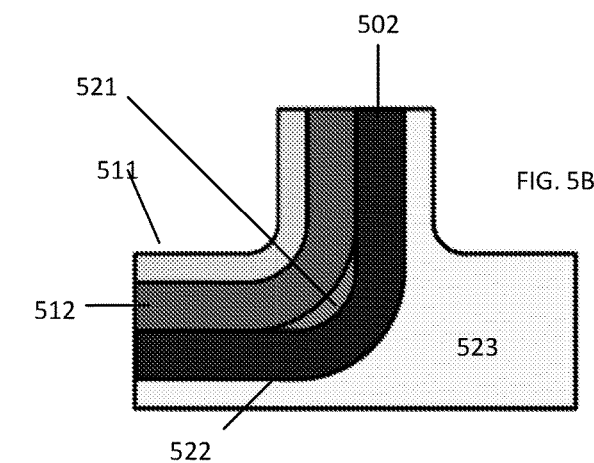
Figure 5C:
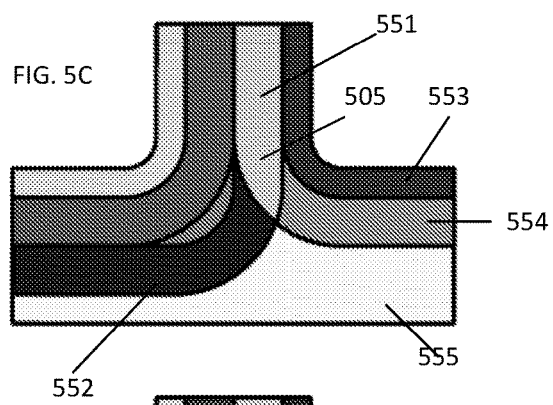
Figure 5D:
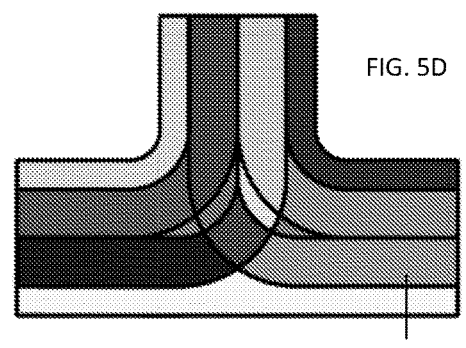
Figure 5E:
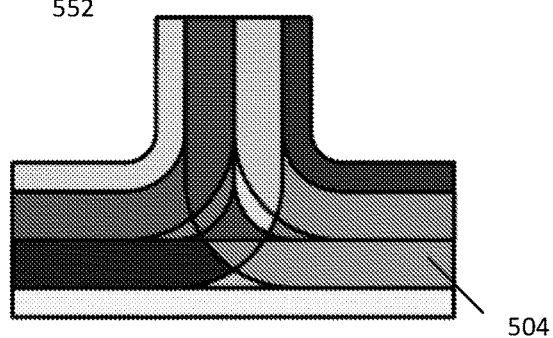
Figure 5F:
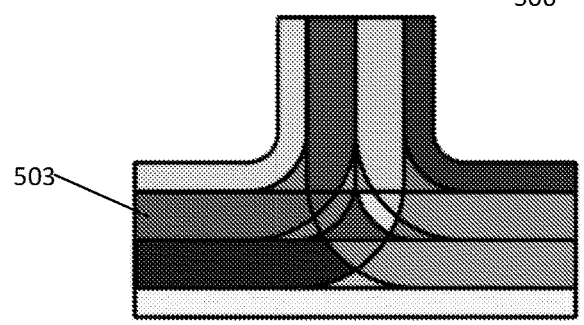

Next, as shown in FIG. 5B, a region 502 corresponding to an overlap of the lane segment 302 is identified within the drivable area region 300 of FIG. 5A such that sub-region 513 of FIG. 5A is further divided into three sub-regions 521, 522 (overlapping with 302) and 523. Similarly, a region 505 corresponding to an overlap of the lane segment 305 is identified within the drivable area region 300 of FIG. 5B such that sub-region 522 of FIG. 5B is further divided into two sub-regions 551, 552, and sub-region 523 of FIG. 5B is further divided into three sub-regions 553, 554, and 555 (as shown in FIG. 5C). The process is repeated until overlapping regions corresponding to all the lane segments are identified within the drivable area as shown in FIG. 5D (a region 506 corresponding to an overlap of the lane segment 306 is identified), FIG. 5E (a region 504 corresponding to an overlap of the lane segment 304 is identified), and FIG. 5F (a region 503 corresponding to an overlap of the lane segment 303 is identified) to identify the plurality of smaller regions shown in FIG. 4.

In this manner, the system may start with a single drivable area region, and iteratively identify regions that overlap with the identified lane segments to sequentially divide the drivable area region into smaller regions to generate a mesh including a plurality of smaller regions. A union of the plurality of smaller regions yields the drivable area region. Moreover, at least some of the smaller mesh regions may be associated with corresponding lane segments such that each lane segment may be represented as a union of a subset of the plurality of smaller mesh regions. Specifically, a mesh region may be associated with whichever lane segment(s) contains that region within its boundary. Optionally, certain regions of the mesh may not correspond to any of the lane segments.

It should be noted that the sequence of identification of lane segment overlapping portions shown in FIGS. 5A-5F is exemplary, and any other sequence and/or parallel identification of regions overlapping with the lane segments within the drivable area may be performed.

As discussed above, any now or hereafter known methods for dividing regions into a plurality of smaller regions using geometrical constructs may be used. For example, in an example embodiment, the system may divide the drivable area region by projecting a representation of the drivable area region on a two-dimensional (2D) surface representative of the drivable area (e.g., in the xy-plane). The 2D surface may include a mesh representation of the drivable area include a first plurality of polygons. Next, for each lane segment having a portion that intersects with the drivable area region, at least the intersecting portion of the lane segment may also be projected on the 2D surface. The system may then generate the plurality of regions as follows:

For each lane segment S in the drivable area
  a. Project polygon P of S onto xy-plane
  b. For each polygon P' in the mesh
    i. If P"=intersection(P, P') exists
      1. If P==P"
        a. Add P" to the mesh
        b. Add guid(S) to list of IDs for P"
        c. Add all ID labels from P' to P"
      2. If P'==P"
        a. Add guid(S) to list of IDs for P'
      3. Else
        a. Split P' by edges of P". Maintain ID labels
        b. Add guid(S) to list of IDs for P"
      4. Triangulate the mesh
      5. For each vertex V in the mesh
        a. set Vz=height(Vx, V y)
      6. For each polygon P in the mesh
        a. Make an entry for P in the lane segment lookup table for each labeled ID Specifically, the system may determine whether there exists a portion of the lane segment projection (of the lane segment being analyzed) that intersects with the drivable area projection on the mesh. If an intersection is found, in a data store that stores information about the polygons in the mesh, the mesh's polygons that lie within the intersection are updated to incorporate the lane segment's information as follows: (i) If a polygon in the mesh is entirely within the boundaries of the lane segment, the lane segment's ID is associated with that polygon. (ii) However, when a polygon in the mesh is not entirely within the boundaries of the lane segment, the polygon is divided into sub-polygons by the boundary of the lane segment. Each of the sub-polygons are associated with the list of lane segments previously associated with the parent polygon, and the sub-polygon(s) that include the area attributed to the lane segment also include the lane segment's ID (of the lane segment being analyzed). This process may be repeated for all the polygons within the drivable area projection on the mesh, and for all the identified lane segments.

Optionally, the system may triangulate the region mesh from step 206 to generate a mesh including a plurality of polygons (e.g., triangles) that is representative of the drivable area (208). The polygon mesh may include polygon vertices. In various embodiments, the system may associate or assign a height with each vertex in the polygon mesh by, for example, querying the height elements associated with the corresponding lane segments and/or drivable area elevation data. Association of height with the vertices allows for creation of a 2-dimensional mesh that can be used to render 3-dimensional maps.

A union of the plurality of smaller polygons of the mesh yields the drivable area region. Moreover, at least some of the mesh polygons may be associated with corresponding lane segments such that each lane segment may be represented as a union of a subset of the plurality of mesh polygons. Specifically, a mesh polygon may be associated with whichever lane segment(s) contains that polygon within its boundary. Optionally, certain polygons of the mesh may not correspond to any of the lane segments.

The resulting mesh (or collection of polygons) for the drivable area does not include any overlapping polygons, has superior topological accuracy and detail while only adding a minimal number of internal vertices that are required to reconstruct individual lane segments. This also allows for improvement in memory efficiency and cache coherence because vertices may be shared between lane segments and a drivable area within a single storage buffer. Specifically, separate layers or data groups are not needed to render the drivable area and the lane segments. Rather, information from the drivable area mesh may be used to render both the drivable area as well as the corresponding lane segments. Additionally and/or alternatively, the lane segment can be rendered using the drivable area mesh to have lane markings that substantially align with a drivable area surface and can be drawn without z-fighting.

Figure 6:
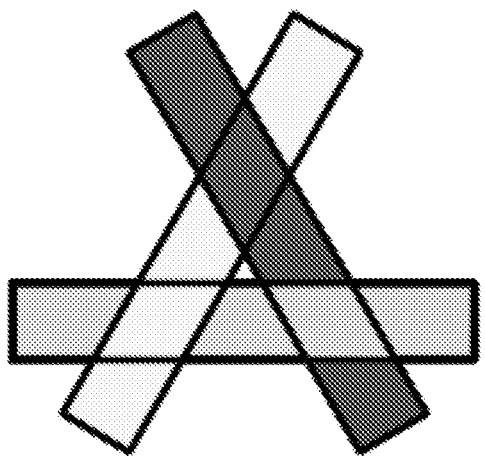
FIG. 6 illustrates schematic representation of rendering of example lane segments of FIG. 1 in accordance with the current disclosure.

The drivable area mesh can be used to render lane segments that are interleaved with or subdivided by other lane segment of the drivable area making it possible to show overlapping lanes (e.g., lanes having different elevations but occupying the same geographical regions such as overpasses) without loss of information. As such, the generated drivable area mesh also allows for observance of lane prioritization rules during rendering because the drivable area as well as the lane segments comprise multiple smaller polygons (instead of a single block) that can be interleaved with other structures. For example, as shown in FIG. 6 (corresponding to the lane geometries of FIG. 1), the lane segments are broken down into smaller polygons (from the drivable area) such that all of the above discussed prioritization rules can be taken into account.

While the disclosure describes creation of a drivable area mesh using lane segments, it is not so limiting Similar principles may be used to segment any geometrical map region that includes smaller geometrical constructs.

Referring again to FIG. 2, in various embodiments, the system may create 210 a drivable area data object for a drivable area. Such a data object refers to a data representation of a drivable area as a union of a plurality of polygons (and/or untriangulated mesh regions) that are formed using lane segments corresponding to the drivable area. For example, a drivable area data object may be a data structure or other data construct. The system may assign a unique identifier to the drivable data object. The unique identifier may be random or pseudo-randomly generated. Alternatively, the unique identifier may be sequentially or otherwise assigned by the system. The drivable area object may include, for example, a listing of the polygons generated in accordance with this disclosure (e.g., identified using a unique identifier), polygon coordinates (or locations), polygon vertex information (e.g., coordinates), height information of each vertex in the mesh, or the like. Optionally, the polygon mesh may also be associated with attributes, properties, and/or other information about the drivable area and/or corresponding lane segments.

The system may also add a listing of the lane segments that form the drivable area to the drivable area data object. The listing may include, for example, an identifier associated with each lane segment, polygons of the drivable area mesh associated with each lane segment, the geometrical location of each lane segment within the drivable area, the, and/or the like. For instance, the system may assign a unique segment identifier each lane segment, and each polygon of the plurality of polygons, and may add these unique lane segment identifiers and/or the polygon identifiers to the drivable area data object.

Optionally, the system may also create one or more lane segment data objects to include a listing of the polygons of the drivable area that form the lane segment. The listing may include, for example, a drivable area identifier, an identifier associated with each polygon, height associated with a vertex of each polygon, the geometrical location of each polygon within the drivable area, and/or the like.

In various embodiments, the system may group the plurality of polygons of the drivable area into subsets, each subset associated with a lane segment. Optionally, the system may store information relating to a subset of polygons of the drivable area mesh that are associated with a lane segment in a data store (e.g., grouped as a look up table, data entry, or the like) corresponding to the drivable area and/or the lane segment. This information may include, for example, an identifier associated with a polygon subset, identifier associated with polygons in the subset, the location of the polygons in the subset with respect to the drivable area, lane segment identification, information about the vertex heights, and/or the like.

In various embodiments, the system may store the drivable area data object and/or the lane segment data object in one or more data stores (e.g., map data stores) such that it is accessible by one or more systems or subsystems of the autonomous vehicle such as, for example, a mapping system, a prediction system, perception system, a motion planning system, and/or the like. The system may also add the drivable area data object and/or the lane segment data object to one or more maps such as, for example, a road network map, a drivable area map, lane segment map, etc. As such, when the map is loaded or rendered, information pertaining to the drivable area data object and/or the lane segment data object may be presented to a system user. For instance, the plurality of polygons of a drivable area and/or the lane segments may be visually displayed via one or more display devices. Other presentations of information pertaining to a drivable area data object and/or the lane segment data object are contemplated within the scope of this disclosure.

The drivable area data object and/or the lane segment data object may be used by an autonomous vehicle in a variety of ways. For example, a mapping system and/or navigation system of an autonomous vehicle may use information within a drivable area data object and/or the lane segment data object to render maps for vehicle navigation (e.g., drivable area maps, lane segment maps, etc.).

As another example, a motion planning system of the autonomous vehicle may use information within a drivable area data object and/or the lane segment data object to output an autonomous vehicle trajectory for traversing the drivable area and/or a lane segment.

Illustrative Vehicle Based Systems:

The above-described drivable area data objects can be used in a plurality of applications. Such applications include, but are not limited to, vehicle-based applications. The following discussion is provided to illustrate how the drivable area data object and map generation methods of the present solution can be used to facilitate control of a vehicle (e.g., for collision avoidance and/or autonomous driving purposes). The vehicle can include, but is not limited to, an autonomous vehicle.

Figure 7:
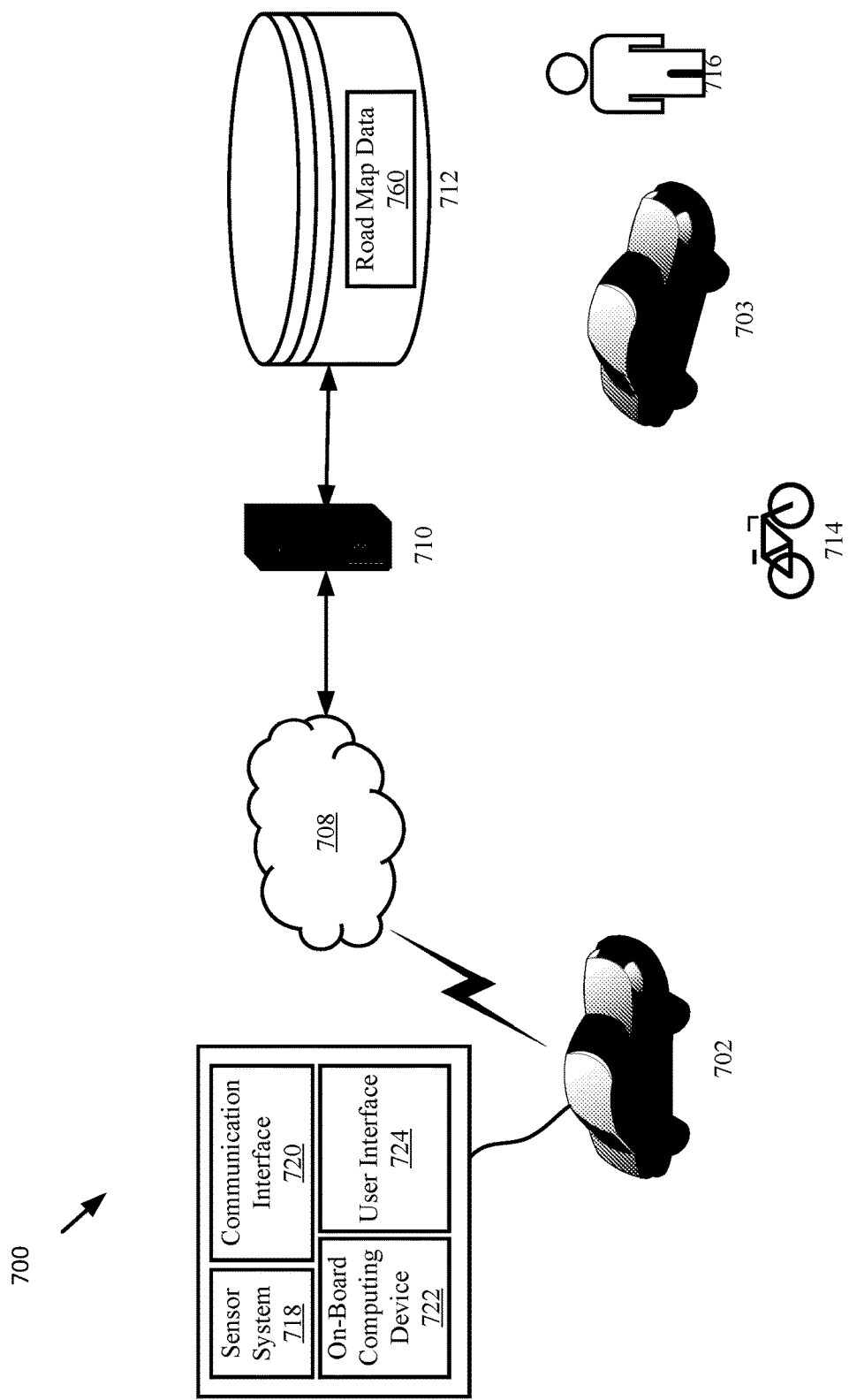
FIG. 7 provides an illustration of an autonomous vehicle system.

FIG. 7 illustrates an example system 700, in accordance with aspects of the disclosure. System 700 comprises a vehicle 702 that is traveling along a road in a semi-autonomous or autonomous manner. Vehicle 702 is also referred to in this document as AV 702. AV 702 can include, but is not limited to, a land vehicle (as shown in FIG. 7), an aircraft, or a watercraft. As noted above, except where specifically noted this disclosure is not necessarily limited to AV embodiments, and it may include non-autonomous vehicles in some embodiments.

AV 702 is generally configured to detect objects in its proximity. The objects can include, but are not limited to, a vehicle 703, cyclist 714 (such as a rider of a bicycle, electric scooter, motorcycle, or the like) and/or a pedestrian 716.

As illustrated in FIG. 7, the AV 702 may include a sensor system 718, an on-board computing device 722, a communications interface 720, and a user interface 724. Autonomous vehicle system may further include certain components (as illustrated, for example, in FIG. 11) included in vehicles, which may be controlled by the on-board computing device 722 using a variety of communication signals and/or commands, such as, for example, acceleration signals or commands, deceleration signals or commands, steering signals or commands, braking signals or commands, etc.

The sensor system 718 may include one or more sensors that are coupled to and/or are included within the AV 702. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 702, information about the environment itself, information about the motion of the AV 702, information about a route of the vehicle, or the like. As AV 702 travels over a surface, at least some of the sensors may collect data pertaining to the surface.

The AV 702 may also communicate sensor data collected by the sensor system to a remote computing device 710 (for example, a cloud processing system) over communications network 708. Remote computing device 710 may be configured with one or more servers to perform one or more processes of the technology described in this document. Remote computing device 710 may also be configured to communicate data/instructions to/from AV 702 over network 708, to/from server(s) and/or datastore(s) 712. Datastore(s) 712 may include, but are not limited to, database(s).

Network 708 may include one or more wired or wireless networks. For example, the network 708 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 702 may retrieve, receive, display, and edit information generated from a local application or delivered via network 708 from datastore 712. Datastore 712 may be configured to store and supply raw data, indexed data, structured data, road map data 760 (e.g., including the drivable area and/or lane segment data objects), program instructions or other configurations as is known.

The communications interface 720 may be configured to allow communication between AV 702 and external systems, such as, for example, external devices, sensors, other vehicles, servers, data stores, databases, etc. The communications interface 720 may utilize any now or hereafter known protocols, protection schemes, encodings, formats, packaging, etc. such as, without limitation, Wi-Fi, an infrared link, Bluetooth, etc. The user interface system 724 may be part of peripheral devices implemented within the AV 702 including, for example, a keyboard, a touch screen display device, a microphone, and a speaker, etc. The vehicle also may receive state information, descriptive information or other information about devices or objects in its environment via the communication interface 720 over communication links such as those known as vehicle-to-vehicle, vehicle-to-object or other V2X communication links. The term "V2X" refers to a communication between a vehicle and any object that the vehicle may encounter or affect in its environment.

Figure 8:
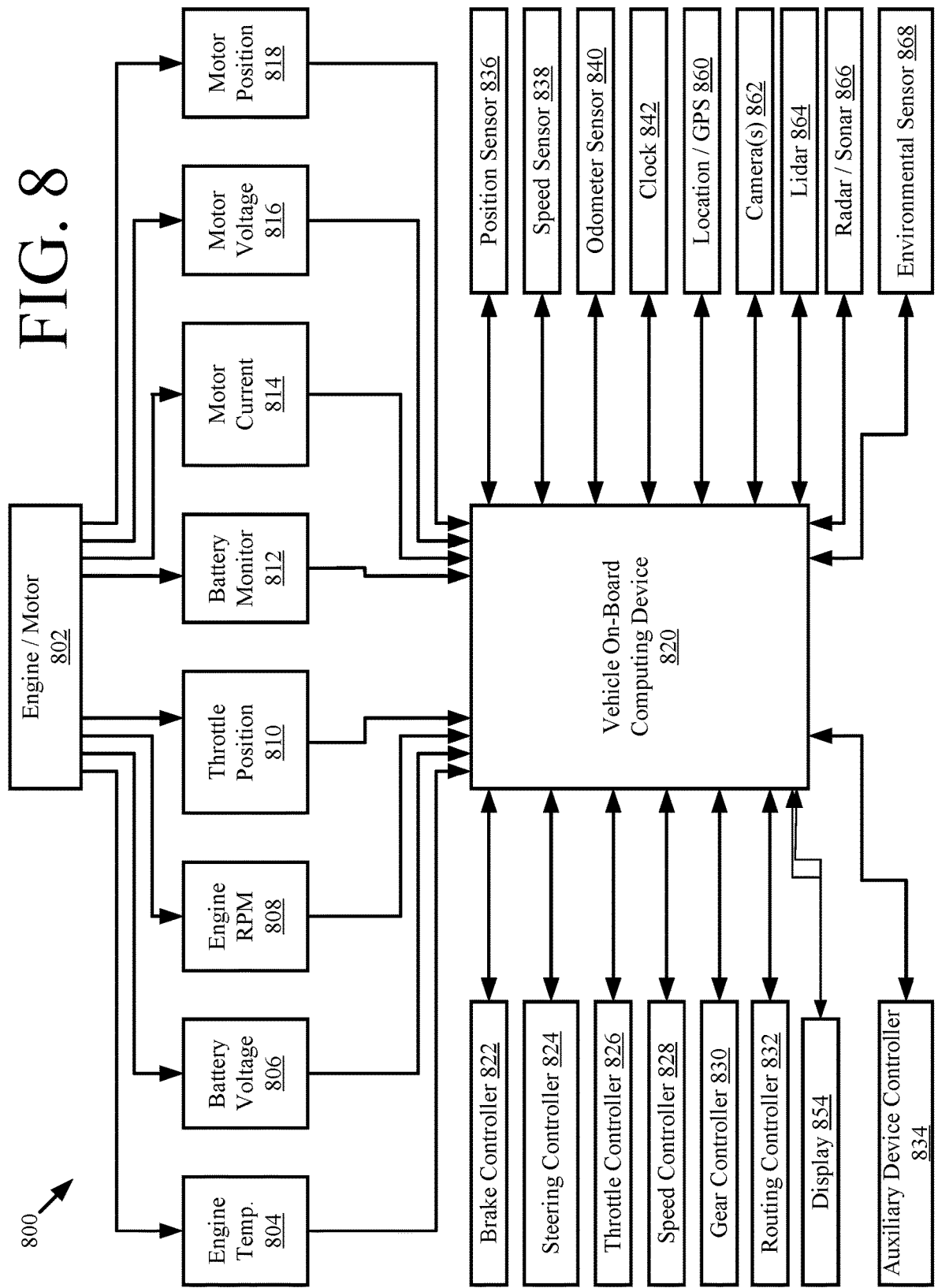
FIG. 8 provides a more detailed illustration of an autonomous vehicle.

FIG. 8 illustrates an example system architecture 800 for a vehicle, in accordance with aspects of the disclosure. Vehicles 702 and/or 703 of FIG. 7 can have the same or similar system architecture as that shown in FIG. 8. Thus, the following discussion of system architecture 800 is sufficient for understanding vehicle(s) 702, 703 of FIG. 7. However, other types of vehicles are considered within the scope of the technology described in this document and may contain more or less elements as described in association with FIG. 8. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 8, system architecture 800 for a vehicle includes an engine or motor 802 and various sensors 804-818 for measuring various parameters of the vehicle. In gas-powered or hybrid vehicles having a fuel-powered engine, the sensors may include, for example, an engine temperature sensor 804, a battery voltage sensor 806, an engine revolutions per minute (RPM) sensor 808, and a throttle position sensor 810. If the vehicle is an electric or hybrid vehicle, then the vehicle may have an electric motor, and accordingly includes sensors such as a battery monitoring system 812 (to measure current, voltage and/or temperature of the battery), motor current 814 and voltage 816 sensors, and motor position sensors 818 such as resolvers and encoders.

Operational parameter sensors that are common to both types of vehicles include, for example: a position sensor 836 such as an accelerometer, gyroscope and/or inertial measurement unit; a speed sensor 838; and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 860 (such as a Global Positioning System (GPS) device); object detection sensors such as one or more cameras 862; a lidar system 864; and/or a radar and/or a sonar system 866. The sensors also may include environmental sensors 868 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 820. The vehicle on-board computing device 820 may be implemented using the computer system of FIG. 10. The vehicle on-board computing device 820 analyzes the data captured by the sensors and optionally controls operations of the vehicle based on results of the analysis. For example, the vehicle on-board computing device 920 may control: braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers. Auxiliary device controller 834 may be configured to control one or more auxiliary devices, such as testing systems, auxiliary sensors, mobile devices transported by the vehicle, etc.

Geographic location information may be communicated from the location sensor 860 to the vehicle on-board computing device 820, which may then access a map of the environment that corresponds to the location information to determine known fixed features of the environment such as streets, buildings, stop signs and/or stop/go signals. Captured images from the cameras 862 and/or object detection information captured from sensors such as lidar system 864 is communicated from those sensors) to the vehicle on-board computing device 820. The object detection information and/or captured images are processed by the vehicle on-board computing device 820 to detect objects in proximity to the vehicle. Any known or to be known technique for making an object detection based on sensor data and/or captured images can be used in the embodiments disclosed in this document.

Lidar information is communicated from lidar system 864 to the vehicle on-board computing device 820. Additionally, captured images are communicated from the camera(s) 862 to the vehicle on-board computing device 820. The lidar information and/or captured images are processed by the vehicle on-board computing device 820 to detect objects in proximity to the vehicle. The manner in which the object detections are made by the vehicle on-board computing device 820 includes such capabilities detailed in this disclosure.

In addition, the system architecture 800 may include an onboard display device 854 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 820 may include and/or may be in communication with a routing controller 832 that generates a navigation route from a start position to a destination position for an autonomous vehicle. The routing controller 832 may access a map data store to identify possible routes and road segments that a vehicle can travel on to get from the start position to the destination position. The routing controller 832 may score the possible routes and identify a preferred route to reach the destination. For example, the routing controller 832 may generate a navigation route that minimizes Euclidean distance traveled or other cost function during the route, and may further access the traffic information and/or estimates that can affect an amount of time it will take to travel on a particular route. Depending on implementation, the routing controller 832 may generate one or more routes using various routing methods, such as Dijkstra's algorithm, Bellman-Ford algorithm, or other algorithms. The routing controller 832 may also use the traffic information to generate a navigation route that reflects expected conditions of the route (for example, current day of the week or current time of day, etc.), such that a route generated for travel during rush-hour may differ from a route generated for travel late at night. The routing controller 832 may also generate more than one navigation route to a destination and send more than one of these navigation routes to a user for selection by the user from among various possible routes.

In various embodiments, the vehicle on-board computing device 820 may determine perception information of the surrounding environment of the AV. Based on the sensor data provided by one or more sensors and location information that is obtained, the vehicle on-board computing device 820 may determine perception information of the surrounding environment of the AV. The perception information may represent what an ordinary driver would perceive in the surrounding environment of a vehicle. The perception data may include information relating to one or more objects in the environment of the AV. For example, the vehicle on-board computing device 820 may process sensor data (for example, lidar or radar data, camera images, etc.) in order to identify objects and/or features in the environment of AV. The objects may include traffic signals, roadway boundaries, other vehicles, pedestrians, and/or obstacles, etc. The vehicle on-board computing device 820 may use any now or hereafter known object recognition algorithms, video tracking algorithms, and computer vision algorithms (for example, track objects frame-to-frame iteratively over a number of time periods) to determine the perception.

In some embodiments, the vehicle on-board computing device 820 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The vehicle on-board computing device 820 may perform one or more prediction and/or forecasting operations. For example, the vehicle on-board computing device 820 may predict future locations, trajectories, and/or actions of one or more objects. For example, the vehicle on-board computing device 820 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the AV, the surrounding environment, and/or their relationship(s). For example, if an object is a vehicle and the current driving environment includes an intersection, the vehicle on-board computing device 820 may predict whether the object will likely move straight forward or make a turn. If the perception data indicates that the intersection has no traffic light, the vehicle on-board computing device 820 may also predict whether the vehicle may have to fully stop prior to entering the intersection.

In various embodiments, the vehicle on-board computing device 820 may determine a motion plan for the autonomous vehicle. For example, the vehicle on-board computing device 820 may determine a motion plan for the autonomous vehicle based on the perception data and/or the prediction data. Specifically, given predictions about the future locations of proximate objects and other perception data, the vehicle on-board computing device 820 can determine a motion plan for the AV that best navigates the autonomous vehicle relative to the objects at their future locations.

In some embodiments, the vehicle on-board computing device 820 may receive predictions and make a decision regarding how to handle objects and/or actors in the environment of the AV. For example, for a particular actor (for example, a vehicle with a given speed, direction, turning angle, etc.), the vehicle on-board computing device 820 decides whether to overtake, yield, stop, and/or pass based on, for example, traffic conditions, map data, state of the autonomous vehicle, etc. Furthermore, the vehicle on-board computing device 820 also plans a path for the AV to travel on a given route, as well as driving parameters (for example, distance, speed, and/or turning angle). That is, for a given object, the vehicle on-board computing device 820 decides what to do with the object and determines how to do it. For example, for a given object, the vehicle on-board computing device 820 may decide to pass the object and may determine whether to pass on the left side or right side of the object (including motion parameters such as speed). The vehicle on-board computing device 820 may also assess the risk of a collision between a detected object and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the vehicle on-board computing device 820 may execute one or more control instructions to perform a cautious maneuver (for example, mildly slow down, accelerate, change lane, or swerve). In contrast, if the collision cannot be avoided, then the vehicle on-board computing device 820 may execute one or more control instructions for execution of an emergency maneuver (for example, brake and/or change direction of travel).

As discussed above, planning and control data regarding the movement of the autonomous vehicle is generated for execution. The vehicle on-board computing device 820 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 9:
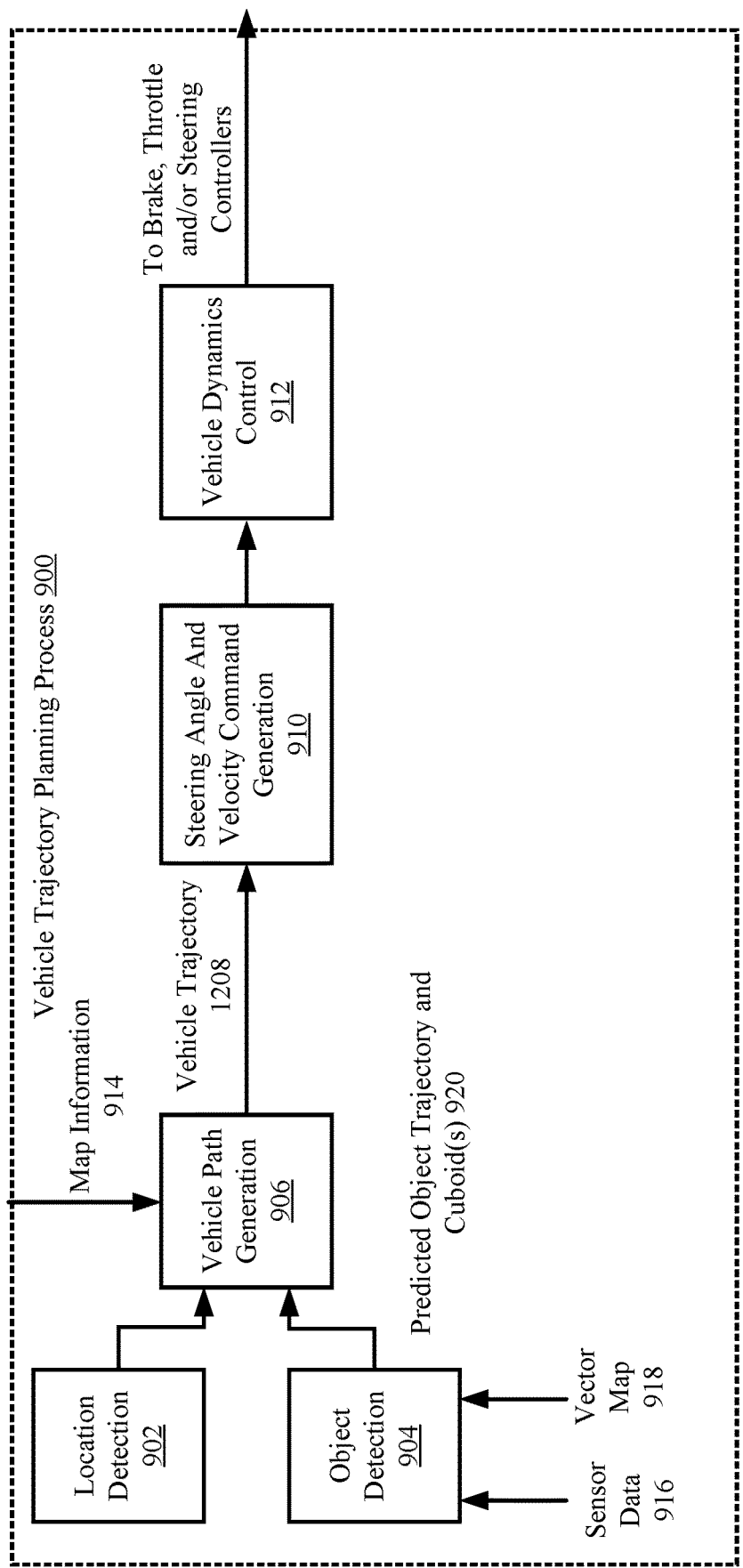
FIG. 9 provides a block diagram of an illustrative vehicle trajectory planning process.

FIG. 9 provides a block diagram that is useful for understanding how motion or movement of an AV is achieved in accordance with the present solution. All of the operations performed in blocks 902-912 can be performed by the on-board computing device (for example, on-board computing device 722 of FIG. 7 and/or 820 of FIG. 8) of a vehicle (for example, AV 702 of FIG. 7).

In block 902, a location of the AV (for example, AV 702 of FIG. 7) is detected. This detection can be made based on sensor data output from a location sensor (for example, location sensor 860 of FIG. 8) of the AV. This sensor data can include, but is not limited to, GPS data. The detected location of the AV is then passed to block 906.

In block 904, an object (for example, vehicle 703 of FIG. 7) is detected within proximity of the AV (for example, <100+ meters). This detection is made based on sensor data output from a camera (for example, camera 862 of FIG. 8) of the AV and/or a lidar system (for example, lidar system 864 of FIG. 8) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 904 for the object. The object's trajectory is predicted in block 904 based on the object's class, cuboid geometry(ies), cuboid heading(s) and/or contents of a map 918 (for example, sidewalk locations, lane locations, lane directions of travel, driving rules, etc.). The cuboid geometry(ies) and/or heading(s) are determined using sensor data of various types (for example, 2D images, 3D lidar point clouds) and a vector map 918 (for example, lane geometries or drivable area maps created in accordance with this disclosure) and using any now or hereafter know methods and systems.

Information 920 specifying the object's predicted trajectory, the cuboid geometry(ies)/heading(s) is provided to block 906. In some scenarios, a classification of the object is also passed to block 906. In block 906, a vehicle trajectory is generated using the information from blocks 902 and 904. Techniques for determining a vehicle trajectory using cuboids may include, for example, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 920 can be determined based on the location information from block 902, the object detection information from block 904, and/or map information 914 (which is pre-stored in a data store of the vehicle). The map information 914 may include, but is not limited to, all or a portion of road map(s) 760 of FIG. 7. The vehicle trajectory 920 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 920 is then provided to block 908.

In block 910, a steering angle and velocity command is generated based on the vehicle trajectory 920. The steering angle and velocity command are provided to block 910 for vehicle dynamics control, i.e., the steering angle and velocity command causes the AV to follow the vehicle trajectory 908.

Various embodiments can be implemented, for example, using one or more computer systems, such as computer system 1000 shown in FIG. 10. Computer system 1000 can be any computer capable of performing the functions described in this document.

Computer system 1000 includes one or more processors (also called central processing units, or CPUs), such as a processor 1004. Processor 1004 is connected to a communication infrastructure or bus 1002. Optionally, one or more of the processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1016, such as monitors, keyboards, pointing devices, etc., that communicate with communication infrastructure 1002 through user input/output interface(s) 1008.

Computer system 1000 also includes a main or primary memory 1006, such as random access memory (RAM). Main memory 1006 may include one or more levels of cache. Main memory 1006 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 1014 reads from and/or writes to removable storage unit 1018 in a well-known manner.

According to an example embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 1000, main memory 1006, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described in this document. The features from different embodiments disclosed herein may be freely combined. For example, one or more features from a method embodiment may be combined with any of the system or product embodiments. Similarly, features from a system or product embodiment may be combined with any of the method embodiments herein disclosed.

As described above, this document discloses system, method, and computer program product embodiments for controlling navigation of an autonomous vehicle for traversing a geographical area are disclosed. The computer program embodiments include programming instructions (e.g., stored in a memory), to cause a processor to perform the autonomous vehicle navigation methods described in this document. The system embodiments also include a processor which is configured to perform the autonomous vehicle navigation methods described in this document, e.g., via the programming instructions. More generally, the system embodiments include a system comprising means to perform the steps of the any of the methods described in this document.

In various embodiments, the methods may include receiving information relating to a drivable area in the geographical area and identifying a plurality of lane segments that intersect with the drivable area. The plurality of lane segments can be used to segment the drivable area into a plurality of sub-regions such that each of the plurality of lane segments can be represented as a union of a unique subset of the plurality of sub-regions. A data representation of the drivable area may be created to include the plurality of sub-regions, and used to render the map of the geographical area. The map may include the drivable area and/or one or more of the plurality of lane segments.

In various embodiments, the methods may also include using the map to control navigation of an autonomous vehicle.

In any of the above embodiments, the methods may also include generating, using the plurality of sub-regions, a mesh comprising a plurality of polygons. Optionally, a height may be assigned to vertices of each of the plurality of polygons, the height being associated with a lane segment that includes that polygon. Additionally and/or alternatively, the mesh may be a 2-dimensional mesh configured for rendering a first map comprising the drivable area or a second map comprising the plurality of lane segments.

In any of the above embodiments, the methods may also include using the data representation for creating a data representation of one or more of the plurality of lane segments that includes information relating to one or more of the plurality of sub-regions that lie within a boundary of a lane segment.

Optionally, in any of the above embodiments, segmenting the drivable area into the plurality of sub-regions may include generating a plurality of borders of overlapping regions between the drivable area in each of the plurality of lane segments, wherein the plurality of borders form the plurality of sub-regions.

Optionally, in any of the above embodiments, segmenting the drivable area into the plurality of sub-regions may include projecting a representation of the drivable area on a 2-dimensional mesh comprising a plurality of polygons, for each of the plurality of lane segments identifying a region on the 2-dimensional mesh where a projection of a representation of that lane segment on the 2-dimensional mesh overlaps with the projected representation of the drivable area, and sequentially generating borders for the plurality of overlapping regions identified for the plurality of lane segments. Additionally and/or alternatively, creating the data representation may include, for each of the plurality of lane segments: identifying one or more polygons of the plurality of polygons that lie completely within the region on the 2-dimensional mesh where the projection of the representation of that lane segment on the 2-dimensional mesh overlaps with the projected representation of the drivable area, and associating the one or more polygons with that lane segment in the data representation. Optionally, creating the data representation may include, for each of the plurality of lane segments: identifying a polygon of the plurality of polygons that lies partially within the region on the 2-dimensional mesh where the projection of the representation of that lane segment on the 2-dimensional mesh overlaps with the projected representation of the drivable area; divide the identified polygon into a plurality of sub-polygons using that lane segment boundary, and associating a sub-polygon of the plurality of sub-polygons with that lane segment in the data representation, wherein the sub-polygon overlaps with that lane segment.

Optionally, in any of the above embodiments, creating the data representation may include associating each of the plurality of lane segments with one or more of the plurality of sub-regions that lie within a boundary of that lane segment.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," and the like each refer to a non-transitory device on which computer-readable data, programming instructions or both are stored. The terms "storage," "storage device," and "disk storage" specifically refer to a non-transitory device, such as a hard drive (HDD) or solid-state drive (SDD), that stores data persistently for a relatively longer period. The term "memory" may be used generally in this document to refer either to a storage device that stores information on a persistent basis, or to a device that stores information on a non-persistent basis such as a random access memory (RAM) device. Except where specifically stated otherwise, the terms "memory," "memory device," "storage," "disk storage," "storage device" and the like are intended to include single device embodiments, embodiments in which multiple devices together or collectively store a set of data or instructions, as well as individual sectors within such devices. A "storage location" is a segment, sector, or portion of a storage device. The relative terms "first storage location" and "second storage location" refer to different storage locations, which may be elements of a single device or elements of multiple devices.

The term "object", when referring to an object that is detected by a vehicle perception system or simulated by a simulation system, is intended to encompass both stationary objects and moving (or potentially moving) actors, except where specifically stated otherwise by terms use of the term "actor" or "stationary object." As used herein, uncertain road users may include pedestrians, cyclists, individuals on roller skates, rollerblades, wheelchairs, individuals, or people in general, etc.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices which may be components of a single device or components of separate devices, together or collectively perform a process.

The term "map" refers to a graphical representation of one or more geographical areas. This representation may include information pertaining to drivable and non-drivable regions, environmental features, building, roads, intersections, curbs, lanes, lane segments, lane boundaries, traffic lights, yielding relationships, and/or other traffic or road-related information.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The features from different embodiments disclosed herein may be freely combined. For example, one or more features from a method embodiment may be combined with any of the system or product embodiments. Similarly, features from a system or product embodiment may be combined with any of the method embodiments herein disclosed.

The breadth and scope of this disclosure should not be limited by any of the above-described example embodiments but should be defined only in accordance with the following claims and their equivalents.

As described above, this document discloses system, method, and computer program product embodiments for generating drivable area meshes and/or maps. The system embodiments include a processor or computing device implementing the methods for generating drivable area meshes and/or maps. The computer program embodiments include programming instructions, for example, stored in a memory, to cause a processor to perform the methods described in this document. The system embodiments also include a processor which is configured to perform the methods described in this document, for example, via the programming instructions. More generally, the system embodiments include a system comprising means to perform the steps of any of the methods described in this document.

Without excluding further possible embodiments, certain example embodiments are summarized in the following clauses.

Clause 1. A method for generating a map of a geographical area, the method comprising, by a processor:
  receiving information relating to a drivable area in the geographical area;
  identifying a plurality of lane segments that intersect with the drivable area;
  segmenting, using the plurality of lane segments, the drivable area into a plurality of sub-regions, wherein each of the plurality of lane segments can be represented as a union of a unique subset of the plurality of sub-regions;
  creating a data representation of the drivable area that comprises the plurality of sub-regions; and
  rendering, using the data representation the map of the geographical area, the map comprising at least one of the following: the drivable area; or one or more of the plurality of lane segments.

Clause 2. The method of clause 1, further comprising using the map to control navigation of an autonomous vehicle.

Clause 3. The method of any of the above clauses, further comprising generating, using the plurality of sub-regions, a mesh comprising a plurality of polygons.

Clause 4. The method of clause 3, further comprising assigning a height to vertices of each of the plurality of polygons, the height being associated with a lane segment that includes that polygon.

Clause 5. The method of clause 3, wherein the mesh is a 2-dimensional mesh configured for rendering a first map comprising the drivable area or a second map comprising the plurality of lane segments.

Clause 6. The method of any of the above clauses, further comprising using the data representation for creating a data representation of one or more of the plurality of lane segments, the data representation of one or more of the plurality of lane segments comprising information relating to one or more of the plurality of sub-regions that lie within a boundary of a lane segment.

Clause 7. The method of any of the above clauses, wherein segmenting the drivable area into the plurality of sub-regions comprises generating a plurality of borders of overlapping regions between the drivable area in each of the plurality of lane segments, wherein the plurality of borders form the plurality of sub-regions.

Clause 8. The method of any of the above clauses, wherein segmenting the drivable area into the plurality of sub-regions comprises:
  projecting a representation of the drivable area on a 2-dimensional mesh comprising a plurality of polygons;
  for each of the plurality of lane segments identifying a region on the 2-dimensional mesh where a projection of a representation of that lane segment on the 2-dimensional mesh overlaps with the projected representation of the drivable area; and
  sequentially generating borders for the plurality of overlapping regions identified for the plurality of lane segments.

Clause 9. The method of clause 8, wherein creating the data representation further comprises, for each of the plurality of lane segments:
  identifying one or more polygons of the plurality of polygons that lie completely within the region on the 2-dimensional mesh where the projection of the representation of that lane segment on the 2-dimensional mesh overlaps with the projected representation of the drivable area; and
  associating the one or more polygons with that lane segment in the data representation.

Clause 10. The method of clause 8, wherein creating the data representation further comprises, for each of the plurality of lane segments:
  identifying a polygon of the plurality of polygons that does not lie completely within the region on the 2-dimensional mesh where the projection of the representation of that lane segment on the 2-dimensional mesh overlaps with the projected representation of the drivable area;
  divide, using that lane segment boundary, the identified polygon into a plurality of sub-polygons; and
  associating a sub-polygon of the plurality of sub-polygons with that lane segment in the data representation, wherein the sub-polygon overlaps with that lane segment.

Clause 11. The method of any of the above clauses, wherein creating the data representation further comprises associating each of the plurality of lane segments with one or more of the plurality of sub-regions that lie within a boundary of that lane segment.

Clause 11. A system comprising means for performing steps of any of the above method clauses.

Clause 12. A computer program, or a storage medium storing the computer program, comprising instructions, which when executed by one or more suitable processors cause any of the processors to perform the steps of any of the above method clauses.

Clause 13. A system for controlling navigation of an autonomous vehicle for traversing a geographical area, the system comprising:
  at least one processor;
  programming instructions stored in a memory and configured to cause the processor to:
    receive information relating to a drivable area in the geographical area;
    identify a plurality of lane segments that intersect with the drivable area;

segment, using the plurality of lane segments, the drivable area into a plurality of sub-regions, wherein each of the plurality of lane segments can be represented as a union of a unique subset of the plurality of sub-regions;

create a data representation of the drivable area that comprises the plurality of sub-regions; and render, using the data representation the map of the geographical area, the map comprising at least one of the following: the drivable area; or one or more of the plurality of lane segments.

Clause 15. The system of clause 13, further comprising additional programming instructions that are configured to cause the processor to use the map to control navigation of an autonomous vehicle.

Clause 16. The system of any of the above system clauses, further comprising additional programming instructions that are configured to cause the processor to generate, using the plurality of sub-regions, a mesh comprising a plurality of polygons.

Clause 17. The system of clause 16, further comprising additional programming instructions that are configured to cause the processor to assign a height to vertices of each of the plurality of polygons, the height being associated with a lane segment that includes that polygon.

Clause 18. The system of clause 16, wherein the mesh is a 2-dimensional mesh configured for rendering a first map comprising the drivable area or a second map comprising the plurality of lane segments.

Clause 19. The system of any of the above system clauses, further comprising additional programming instructions that are configured to cause the processor to use the data representation for creating a data representation of one or more of the plurality of lane segments, the data representation of one or more of the plurality of lane segments comprising information relating to one or more of the plurality of sub-regions that lie within a boundary of a lane segment.

Clause 20. The system of any of the above system clauses, wherein the instructions to segment the drivable area into the plurality of sub-regions comprise instruction to generate a plurality of borders of overlapping regions between the drivable area in each of the plurality of lane segments, wherein the plurality of borders form the plurality of sub-regions.

Clause 21. The system of any of the above system clauses, wherein the instructions to segment the drivable area into the plurality of sub-regions comprise instruction to:

project a representation of the drivable area on a 2-dimensional mesh comprising a plurality of polygons;

for each of the plurality of lane segments, identify a region on the 2-dimensional mesh where a projection of a representation of that lane segment on the 2-dimensional mesh overlaps with the projected representation of the drivable area; and sequentially generate borders for the plurality of overlapping regions identified for the plurality of lane segments.

Clause 22. A computer program product comprising a non-transitory computer-readable medium that stores instructions that, when executed by a computing device, will cause the computing device to perform operations comprising:

receiving information relating to a drivable area in a geographical area;

identifying a plurality of lane segments that intersect with the drivable area;

segmenting, using the plurality of lane segments, the drivable area into a plurality of sub-regions, wherein each of the plurality of lane segments can be represented as a union of a unique subset of the plurality of sub-regions;

creating a data representation of the drivable area that comprises the plurality of sub-regions; and rendering, using the data representation the map of the geographical area, the map comprising at least one of the following: the drivable area; or one or more of the plurality of lane segments.

The invention claimed is:

1. A method for generating a map of a geographical area, the method comprising, by a processor:

receiving information relating to a drivable area in the geographical area;

identifying a plurality of lane segments that intersect with the drivable area;

segmenting the drivable area into a plurality of sub-regions, wherein each of the plurality of lane segments can be represented as a union of a unique subset of the plurality of sub-regions;

creating a data representation of the drivable area that comprises the plurality of sub-regions; and using the data representation to render the map comprising at least one of the following: the drivable area; or one or more of the plurality of lane segments;

wherein the method further comprises:

generating, using the plurality of sub-regions, a mesh comprising a plurality of polygons; and assigning a height to vertices of each of the plurality of polygons, the height being associated with a lane segment that includes that polygon.

2. The method of claim 1, further comprising using the map to control navigation of an autonomous vehicle.

3. The method of claim 1, wherein the mesh is a 2-dimensional mesh configured for rendering a first map comprising the drivable area or a second map comprising the plurality of lane segments.

4. The method of claim 1, further comprising using the data representation for creating a data representation of one or more of the plurality of lane segments, the data representation of one or more of the plurality of lane segments comprising information relating to one or more of the plurality of sub-regions that lie within a boundary of a lane segment.

5. The method of claim 1, wherein segmenting the drivable area into the plurality of sub-regions comprises generating a plurality of borders of overlapping regions between the drivable area in each of the plurality of lane segments, wherein the plurality of borders form the plurality of sub-regions.

6. A method for generating a map of a geographical area, the method comprising, by a processor:

receiving information relating to a drivable area in the geographical area;

identifying a plurality of lane segments that intersect with the drivable area;

segmenting the drivable area into a plurality of sub-regions, wherein each of the plurality of lane segments can be represented as a union of a unique subset of the plurality of sub-regions;

creating a data representation of the drivable area that comprises the plurality of sub-regions; and using the data representation to render the map comprising at least one of the following: the drivable area; or one or more of the plurality of lane segments;

wherein segmenting the drivable area into the plurality of sub-regions comprises:

projecting a representation of the drivable area on a 2-dimensional mesh comprising a plurality of polygons;

for each of the plurality of lane segments identifying a region on the 2-dimensional mesh where a projection of a representation of that lane segment on the 2-dimensional mesh overlaps with the projected representation of the drivable area; and sequentially generating borders for the plurality of overlapping regions identified for the plurality of lane segments.

7. The method of claim 6, wherein creating the data representation further comprises, for each of the plurality of lane segments:

identifying one or more polygons of the plurality of polygons that lie completely within the region on the 2-dimensional mesh where the projection of the representation of that lane segment on the 2-dimensional mesh overlaps with the projected representation of the drivable area; and associating the one or more polygons with that lane segment in the data representation.

8. The method of claim 6, wherein creating the data representation further comprises, for each of the plurality of lane segments:

identifying a polygon of the plurality of polygons that lies partially within the region on the 2-dimensional mesh where the projection of the representation of that lane segment on the 2-dimensional mesh overlaps with the projected representation of the drivable area;

divide, using that lane segment boundary, the identified polygon into a plurality of sub-polygons; and associating a sub-polygon of the plurality of sub-polygons with that lane segment in the data representation, wherein the sub-polygon overlaps with that lane segment.

9. The method of claim 1, wherein creating the data representation further comprises associating each of the plurality of lane segments with one or more of the plurality of sub-regions that lie within a boundary of that lane segment.

10. A system for controlling navigation of an autonomous vehicle for traversing a geographical area, the system comprising:

at least one processor;

programming instructions stored in a memory and configured to cause the processor to:

receive information relating to a drivable area in the geographical area;

identify a plurality of lane segments that intersect with the drivable area;

segment the drivable area into a plurality of sub-regions, wherein each of the plurality of lane segments can be represented as a union of a unique subset of the plurality of sub-regions;

create a data representation of the drivable area that comprises the plurality of sub-regions; and use the data representation to render the map comprising at least one of the following: the drivable area; or one or more of the plurality of lane segments; and additional programming instructions configured to cause the processor to: generate, using the plurality of sub-regions, a mesh comprising a plurality of polygons; and assign a height to vertices of each of the plurality of polygons, the height being associated with a lane segment that includes that polygon.

11. The system of claim 10, further comprising additional programming instructions that are configured to cause the processor to use the map to control navigation of an autonomous vehicle.

12. The system of claim 10, wherein the mesh is a 2-dimensional mesh configured for rendering a first map comprising the drivable area or a second map comprising the plurality of lane segments.

13. The system of claim 10, further comprising additional programming instructions that are configured to cause the processor to use the data representation for creating a data representation of one or more of the plurality of lane segments, the data representation of one or more of the plurality of lane segments comprising information relating to one or more of the plurality of sub-regions that lie within a boundary of a lane segment.

14. The system of claim 10, wherein the instructions to segment the drivable area into the plurality of sub-regions comprise instruction to generate a plurality of borders of overlapping regions between the drivable area in each of the plurality of lane segments, wherein the plurality of borders form the plurality of sub-regions.

15. A system for controlling navigation of an autonomous vehicle for traversing a geographical area, the system comprising:

at least one processor;

programming instructions stored in a memory and configured to cause the processor to:

receive information relating to a drivable area in the geographical area;

identify a plurality of lane segments that intersect with the drivable area;

segment the drivable area into a plurality of sub-regions, wherein each of the plurality of lane segments can be represented as a union of a unique subset of the plurality of sub-regions;

create a data representation of the drivable area that comprises the plurality of sub-regions; and use the data representation to render the map comprising at least one of the following: the drivable area; or one or more of the plurality of lane segments;

wherein the instructions to segment the drivable area into the plurality of sub-regions comprise instruction to:

project a representation of the drivable area on a 2-dimensional mesh comprising a plurality of polygons;

for each of the plurality of lane segments, identify a region on the 2-dimensional mesh where a projection of a representation of that lane segment on the 2-dimensional mesh overlaps with the projected representation of the drivable area; and sequentially generate borders for the plurality of overlapping regions identified for the plurality of lane segments.

16. A computer program product comprising a non-transitory computer-readable medium that stores instructions that, when executed by a computing device, will cause the computing device to perform operations comprising:

receiving information relating to a drivable area in a geographical area;

identifying a plurality of lane segments that intersect with the drivable area;

segmenting the drivable area into a plurality of sub-regions, wherein each of the plurality of lane segments can be represented as a union of a unique subset of the plurality of sub-regions;

creating a data representation of the drivable area that comprises the plurality of sub-regions;

using the data representation to render the map comprising at least one of the following: the drivable area; or one or more of the plurality of lane segments;
using the plurality of sub-regions to generate a mesh comprising a plurality of polygons; and
assigning a height to vertices of each of the plurality of polygons, the height being associated with a lane segment that includes that polygon.

\* \* \* \* \*